(12) United States Patent
Kwon et al.

(10) Patent No.: US 9,640,815 B2
(45) Date of Patent: May 2, 2017

(54) AIR HUMIDIFICATION DEVICE AND AIR HUMIDIFICATION METHOD FOR FUEL CELL USING INJECTOR

(71) Applicant: Hyundai Motor Company, Seoul (KR)

(72) Inventors: Hyuck Roul Kwon, Gyeonggi-Do (KR); Hyun Yoo Kim, Seoul (KR); Chang Ha Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/569,653

(22) Filed: Dec. 13, 2014

(65) Prior Publication Data
US 2015/0349361 A1    Dec. 3, 2015

(30) Foreign Application Priority Data

May 29, 2014  (KR) .................. 10-2014-0065092

(51) Int. Cl.
*H01M 8/22*          (2006.01)
*H01M 8/04291*       (2016.01)
*H01M 8/04119*       (2016.01)
*H01M 8/04082*       (2016.01)

(52) U.S. Cl.
CPC ... *H01M 8/04291* (2013.01); *H01M 8/04126* (2013.01); *H01M 8/04201* (2013.01); *H01M 2250/20* (2013.01); *Y02E 60/50* (2013.01); *Y02T 90/32* (2013.01)

(58) Field of Classification Search
CPC ......... H01M 2250/20; H01M 8/04126; H01M 8/04201; H01M 8/04291; Y02E 60/50; Y02T 90/32
See application file for complete search history.

(56) References Cited

U.S. PATENT DOCUMENTS

| 6,350,536 | B1 * | 2/2002 | Ban .................. H01M 8/04119 429/429 |
| 2002/0094469 | A1 * | 7/2002 | Yoshizumi ........ H01M 8/04089 429/411 |
| 2003/0096145 | A1 | 5/2003 | Sugawara et al. |
| 2012/0237411 | A1 * | 9/2012 | Steinhaus ............... F23D 11/16 422/198 |

FOREIGN PATENT DOCUMENTS

| JP | 2007-242522 A | 9/2007 | |
| JP | 2009-176744 A | 8/2009 | |
| JP | 2010-287541 | * 12/2010 | .............. H01M 8/04 |
| JP | 2012-164457 A | 8/2012 | |
| WO | 2005/015658 A2 | 2/2005 | |

* cited by examiner

*Primary Examiner* — Patrick Ryan
*Assistant Examiner* — Ben Lewis
(74) *Attorney, Agent, or Firm* — Mintz Levin Cohn Ferris Glovsky and Popeo, P.C.; Peter F. Corless

(57) ABSTRACT

Provided are air humidification device and method for a fuel cell. The air humidification device and method for the fuel cell may cool an air compressor and air compressed by the air compressor and easily humidify air supplied to the fuel cell by mixing water with air and injecting the mixture into an inlet of the air compressor. In particular, the air humidification device and method may easily humidify air supplied to a cathode of the fuel cell by bypassing a portion of the compressed air from an outlet of an air compressor supplying air to the cathode of the fuel cell and simultaneously by injecting condensed water discharged from a fuel cell system into an inlet of the air compressor using the bypassed compressed air.

10 Claims, 2 Drawing Sheets

AIR HUMIDIFICATION DEVICE AND AIR HUMIDIFICATION METHOD FOR FUEL CELL USING INJECTOR

CROSS-REFERENCE TO RELATED APPLICATION

This application claims under 35 U.S.C. §119 (a) the benefit of Korean Patent Application No. 10-2014-0065092 filed on May 29, 2014, the entire contents of which are incorporated herein by reference.

TECHNICAL FIELD

The present invention relates to an air humidification device and a method for a fuel cell. The air humidification device and the method for a fuel cell may cool an air compressor and air compressed by the air compressor, and thus, air supplied to the fuel cell may be easily humidified by mixing water with air and injecting the mixture into an inlet of the air compressor.

BACKGROUND

A fuel cell vehicle is a vehicle which is driven by a fuel cell that converts chemical energy into electric energy by a reaction of oxygen and hydrogen. As the fuel cell used in the fuel cell vehicle, a polymer electrolyte membrane fuel cell has been typically used.

When the polymer electrolyte membrane is adequately dipped into water, ion conductivity of the polymer electrolyte membrane is increased, and as consequence, a loss by resistance is reduced. When relative humidity of air and hydrogen which are supplied to the polymer electrolyte membrane is substantially, moisture of the polymer electrolyte membrane is reduced and the ion conductivity of the polymer electrolyte membrane is reduced, and as consequence, the loss by resistance increases. Meanwhile, when reaction gas having substantially reduced humidity is continuously supplied, the electrolyte membrane is dried after all and thus may not be used as the electrolyte membrane at all. As such, in the polymer electrolyte membrane fuel cells, the supplied gas needs to be humidified.

Accordingly, various methods for humidifying a fuel cell for a vehicle have been developed, and as a currently used device for humidifying the fuel cell for the vehicle, a gas-gas membrane humidification device has been widely used.

The gas to gas membrane humidification device is based on a method for making fuel cell exhaust gas flow in a first surface thereof and gas flow in a second surface with a membrane through which only moisture may penetrate the membrane. In particular, the supplied gas is discharged from a stack and simultaneously receives heat and water from the exhaust gas of which the temperature is elevated and the moisture is saturated.

However, the gas to gas membrane humidification device may also be expensive due to high manufacturing cost of an exchange membrane. Further, the gas to gas membrane humidification device may not have sufficient humidification performance and may not perform sufficient humidification in a high load area, and as a result, a vehicle may stop on an uphill road.

Meanwhile, in the conventional membrane humidification device for humidifying the fuel cell, humidification amount may not be controlled optimally. In the related arts, injector type humidification may be generally used for controlling the humidification amount.

The injector type humidification refers to injecting water by the injector to atomize the water such that a surface area may increase for evaporating the water, thereby improving humidification effect.

The humidification using the injector may have advantages. For example, the humidification amount may be easily controlled, injector humidification technologies which have been applied and researched in other technical fields may be applied, cost of the device may be less, and the like.

In the related arts, as an example of the existing injector type humidification technology, a gas humidification device and a method for operating a fuel cell system have been developed. The device includes a water pump pumping water from an external supply source, an air compressor compressing external air, and a mixing chamber and a magnetic type injection nozzle for mixing and injecting the compressed air and the water.

However, the fuel cell system also includes several components such as the compressor, the mixing chamber, and the like in addition to the water pump, and when an additional device is installed, costs may increase and a mounting area may increase in volume. Further, since moving part components such water pump, injection nozzle, and the like in which water flow are exposed to the outside as they are, the water may be easily frozen or leaked in cold temperature conditions.

In another example from the related arts, a water supply device for a fuel cell has been provided. When a proper amount of water is pumped by a water pump, and at the same time, injected into an inlet of a screw compressor by a magnetic nozzle, the injected water may be compressed along with air, cooled by an after-cooler, and then supplied to the fuel cell in the water supply device.

However, as described above, since the moving part components such as water pump, magnetic nozzle, and the like in which water flows are also exposed to the outside as they are, the water may be easily frozen or leaked in the cold weather condition.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides an air humidification device and an air humidification method for a fuel cell which may easily humidify air supplied to a cathode of the fuel cell and obtain an air cooling effect. As such, temperature elevation may be prevented in advance by compressing the supplied air, by bypassing a portion of the compressed air from an outlet of an air compressor supplying air to the cathode of the fuel cell, and simultaneously, by injecting condensed water discharged from the fuel cell system into an inlet of the air compressor by the bypassed compressed air.

In one aspect, the present invention provides an air humidification device for a fuel cell. In an exemplary embodiment, the air humidification device may include: an air compressor supplying air to a cathode of the fuel cell; and a sprayer disposed in an air supply line connected to an inlet of the air compressor and injecting condensed water discharged from the fuel cell from an outlet of the air compressor to the inlet of the air compressor using a pressure of the bypassed compressed air.

In particular, a bypass line connecting the outlet of the air compressor to an inlet of an injector may be provided with a bypass valve which may control an opening and closing angle.

In addition, the injector may be a binary spray nozzle, which may include: an outer hollow body having a first nozzle disposed at a central portion of one side of the outer hollow body; and an inner hollow body having a second nozzle which is inserted into the central portion of the first nozzle and disposed at one end the inner hollow body.

Moreover, the injector may be a binary spray nozzle including: an outer hollow body having a first nozzle disposed at a central portion of one side of the outer hollow body; and an inner hollow body having a second nozzle which is spacedly inserted into the central portion of the first nozzle and is disposed at one end thereof.

In particular, a space between the outer hollow body and the inner hollow body of the injector may be formed as a compressed air flow space which is communicatedly connected to the outlet of the air compressor by a bypass line. In addition, an inner space of the internal hollow body may be formed as a condensed water flow space which is communicatedly connected through a condensed water discharge line connected to a condensed water reservoir of the fuel cell.

Moreover, the outlet of the air compressor may be provided with a relative humidity measuring humidity sensor and a temperature measuring temperature sensor for air supplied to the cathode in parallel.

In another aspect, the present invention provides an air humidification method for a fuel cell, which may include: suctioning and compressing external air by an air compressor and supplying the compressed external air to the fuel cell; bypassing a portion of the compressed air from an outlet of the air compressor to an inlet side of the air compressor; injecting condensed water discharged from the fuel cell into the inlet of the air compressor and simultaneously suctioning the condensed water discharged from the fuel cell using a pressure of the compressed air bypassed to the inlet side of the air compressor; and passing the external air through the air compressor while the external air being humidified by the injected condensed water.

In particular, when an outlet temperature $T_o$ of the air compressor reaches a predetermined temperature $T_t$ or greater, the injected condensed water may be bypassed to the inlet of the air compressor along with the compressed air; and when To is less than Tt, the injection of the condensed water may stop.

In addition, an injection amount of the condensed water may control a bypass amount of the compressed air bypassed from the outlet of the air compressor to the inlet thereby adjust a relative humidity at an outlet side of the air compressor to be equal to or less than about 100%.

Alternatively, an air humidification device for a fuel cell may include: an air compressor supplying air to a cathode of the fuel cell; and an injector disposed in an air supply line connected to an inlet of the air compressor and directly injecting condensed water discharged from the fuel cell to an inlet of the air compressor.

In particular, the injector may be a water injection nozzle which directly injects the condensed water from a condensed water reservoir in which the condensed water discharged from the fuel cell is stored through a condensed water discharge line.

Further, the present invention provides an air humidification method for a fuel cell. The method may include: suctioning and compressing external air by an air compressor and supplying the compressed external air to the fuel cell; directly injecting condensed water discharged from the fuel cell into an inlet of the air compressor using a water injection nozzle; and passing the external air through the air compressor while the external air being humidified by the injected condensed water.

By the above configuration, the present invention has various advantages. For example, the air supplied to the cathode of the fuel cell may be easily humidified by bypassing a portion of the compressed air from the outlet of the air compressor for supplying external air to the cathode of the fuel cell and simultaneously injecting the condensed water discharged from the fuel cell system into the inlet of the air compressor using the pressure of the bypassed compressed air. In addition, costs may be reduced by ruling out the conventional pump for supplying and pumping water, and the like. Further, a freezing phenomenon, a corrosion phenomenon, and the like of the water supply line including the pump and the like may be prevented by reusing the condensed water discharged from the fuel cell system in order to humidify the air. Moreover, the load of the humidifier may decrease by increasing the relative humidity of the air supplied to the cathode of the fuel cell from the inlet of the air compressor when a separate humidifier is further installed at the inlet side of the cathode. The humidification capacity and the size of the humidifier which is separately installed at the inlet side of the cathode may decrease by increasing the relative humidity of air supplied to the cathode of the fuel cell from the inlet of the air compressor in advance. In addition, cooling effect of the air compressed may be obtained by the condensed water injected into the inlet of the air compressor and the air compressor, thereby improving the aerodynamic performance and the efficiency of the air compressor. The humidification amount may also be controlled by adding a control element.

Also provided are preferred fuel cell systems that include fuel cell air humidification devices of the invention. In addition, preferred vehicle are provided and the vehicles comprise fuel cell systems including the fuel cell air humidification device of the invention.

Other aspects and preferred embodiments of the invention are discussed infra.

BRIEF DESCRIPTION OF THE DRAWINGS

The above and other features of the present invention will now be described in detail with reference to various exemplary embodiments thereof illustrated in the accompanying drawings which are given hereinbelow by way of illustration only, and thus are not limitative of the present invention, and wherein.

Figure 1:
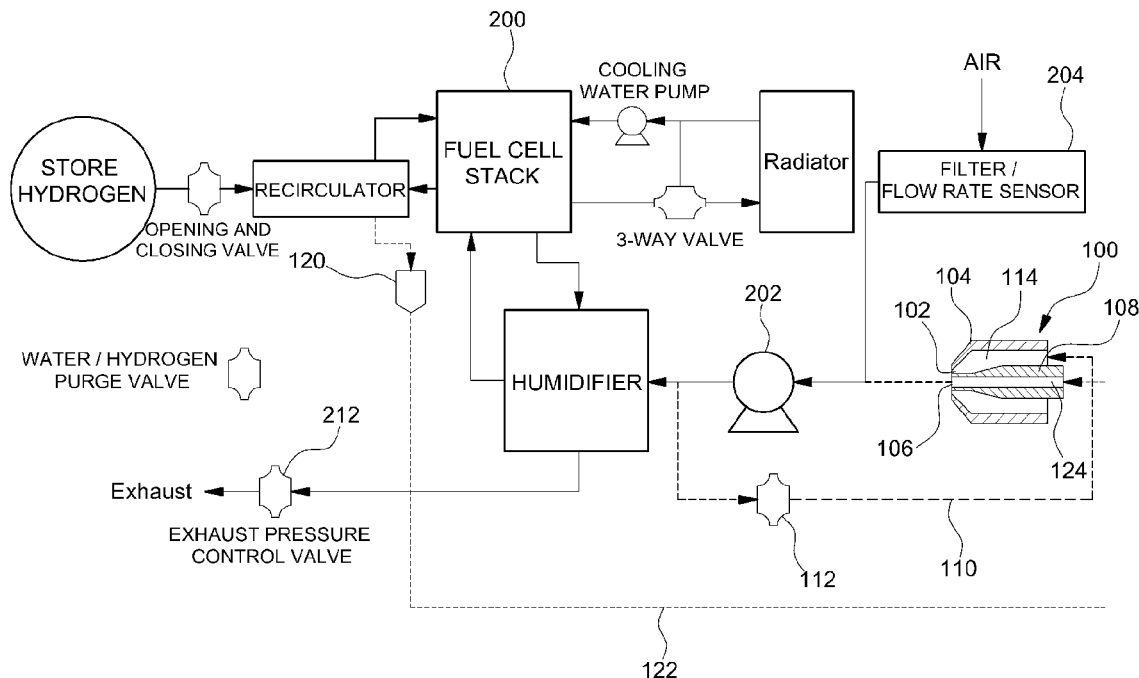
FIG. 1 illustrates an exemplary air humidification device for a fuel cell according to an exemplary embodiment of the present invention.

Reference numerals set forth in the Drawings includes reference to the following elements as further discussed below:

100: binary spray nozzle
102: first nozzle
104: outer hollow body

106: second nozzle
108: inner hollow body
110: bypass line
112: bypass valve
120: condensed water reservoir
122: condensed water discharge line
114: compressed air flow space
124: condensed water flow space
200: fuel cell
202: air compressor
204: filter/flow rate sensor
206: humidity sensor
208: temperature sensor
210: water injection nozzle
212: exhaust pressure control valve It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

According to one aspect of the present invention, air supplied to a cathode of a fuel cell may be easily humidified by bypassing a portion of the compressed air from an outlet of an air compressor for supplying external air to the cathode of the fuel cell and simultaneously by injecting condensed water discharged from a fuel cell system into an inlet of the air compressor by using the bypassed compressed air.

FIG. 1 illustrates an exemplary air humidification device for a fuel cell according to an exemplary embodiment of the present invention.

In FIG. 1, a binary spray nozzle 100 may be used as an injector for injecting water by using high-pressure air as a power source.

Accordingly, the injector may be a the binary spray nozzle 100 such that condensed water discharged from a fuel cell may be injected into an inlet side of an air compressor 202 in a spray form by suction pressure of compressed air.

Figure 2:
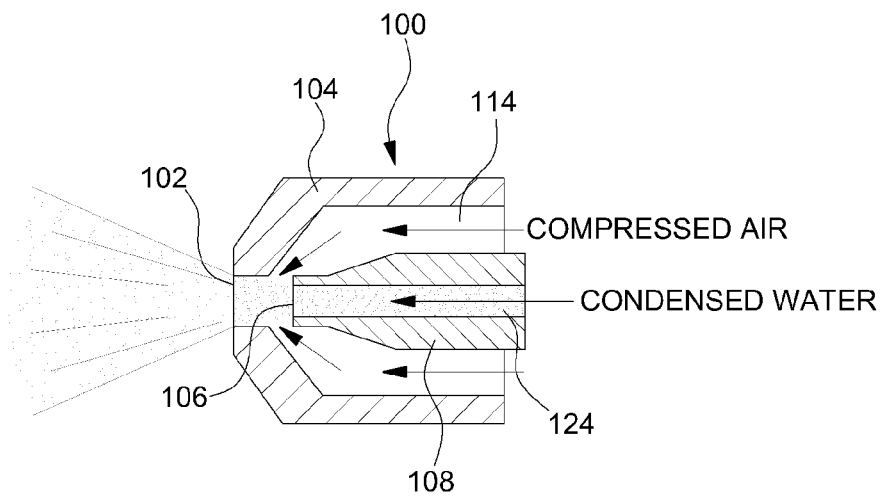
FIGS. 2 and 3 show cross-sectional views illustrating an exemplary binary spray nozzle which may be applied to an exemplary air humidification device for a fuel cell according to an exemplary embodiment of the present invention.

As illustrated in FIG. 2, the binary spray nozzle 100 according to an exemplary embodiment of the present invention may include an outer hollow body 104 having a first nozzle 102 disposed at a central portion of one side of the outer hollow body 104, and an inner hollow body 108 in which a second nozzle 106 is inserted into the central portion of the first nozzle 102 and is formed at one end of the inner hollow body. In particular, the first nozzle 102 and the second nozzle 106 may be in a concentric circle arrangement having the same center on the same vertical line.

Figure 3:
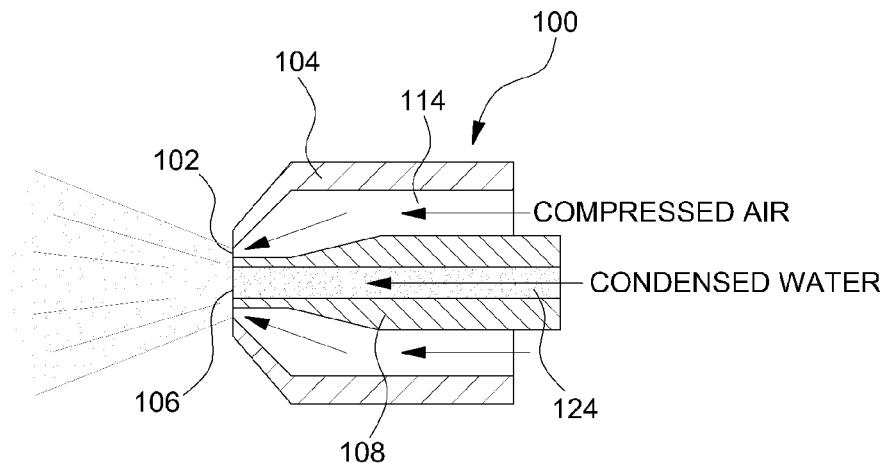

As illustrated in FIG. 3, the binary spray nozzle 100 according to an exemplary embodiment of the present invention may include the outer hollow body 104 having the first nozzle 102 disposed at the central portion of one side thereof; and the inner hollow body 108 having the second nozzle 106 which is spacedly disposed into the central portion of the first nozzle 102 and disposed at one end thereof. The first nozzle 102 and the second nozzle 106 may be in an arrangement spaced apart from each other on the same vertical line.

The air compressor 202 may be, but not limited to, an air blower for compressing and supplying external air to a cathode of a fuel cell 200 or fuel cell stack. An outlet of the air compressor 202 may be connected to the cathode of the fuel cell 200, and an inlet line of the air compressor 202 may be provided with a filter/flow rate sensor 204 which filters the external air and measures an external air flow rate.

In particular, the binary spray nozzle 100 may be disposed in an air supply line between the inlet of the air compressor 202 and the filter/flow rate sensor 204.

Meanwhile, a bypass line 110 for bypassing a portion of the compressed air from the outlet of the air compressor 202 to the inlet of the binary spray nozzle 100 may be connected between the outlet of the air compressor 202 and the inlet of the binary spray nozzle 100, particularly in the bypass line 110, a bypass valve 112 which may control an opening and closing angle to control a supply amount of compressed air may be installed.

The condensed water generated during a reaction of the fuel cell may be discharged from the fuel cell and filled in a condensed water reservoir 120, and a condensed water discharge line 122 for suctioning condensed water into the inlet of the spray nozzle 100 may be connected between an outlet of the condensed water reservoir 120 and the inlet of the binary spray nozzle 100.

In particular, a bypass line 110 which may communicate with the outlet of the air compressor 202 may be connected to a space between an outer hollow body 104 and an inner hollow body 108 of the binary spray nozzle 100. In other words, a compressed air flow space 114 and a condensed water discharge line 122 which may communicate with the condensed water reservoir 120 may be connected to an inner space of the inner hollow body 108 of the binary spray nozzle 100 or to a condensed water flow space 124.

Meanwhile, in the outlet of the air compressor 202, a humidity sensor 206 for measuring relative humidity and a temperature sensor 208 for measuring a temperature of air supplied to the cathode of the fuel cell 200 may be installed in parallel.

Hereafter, a method for humidifying a cathode of a fuel cell of the present invention based on the configuration will be described below.

In the initial operation of the fuel cell system, in order to generate electric energy by a reaction of hydrogen and oxygen in the air in the fuel cell stack, a process of suctioning and compressing external air by the air compressor 202 and supplying the external air to the cathode of the fuel cell 200 is first performed. In this process, a portion of the compressed air supplied from the outlet of the air compressor 202 to the cathode of the fuel cell 200 may be supplied to the binary spray nozzle 100 along the bypass line 110. Simultaneously, condensed water generated during the reaction of the fuel cell and collected into the condensed water reservoir 120 may be supplied to the binary spray nozzle 100. In particular, the condensed water in the condensed water reservoir 120 may be suctioned and supplied into the binary spray nozzle 100 by flow pressure formed by locally reduced pressure of the compressed air which is bypassed from the outlet of the air compressor 202 and supplied to the binary spray nozzle 100.

Accordingly, when the compressed air is bypassed from the outlet of the air compressor 202 and supplied to the binary spray nozzle 100, the supplied compressed air may be injected to the inlet side of the air compressor 202 through the first nozzle 102 via the compressed air flow space 114 which is a space between the outer hollow body 104 and the inner hollow body 108 of the binary spray nozzle 100.

At the same time, the condensed water suctioned from the condensed water reservoir 120 may be injected into the inlet of the air compressor 202 through the second nozzle 102 via the condensed water flow space 124 which is the inner space of the inner hollow body 108 of the binary spray nozzle 100. In other words, the condensed water injected through the second nozzle 102 may be injected in a spray form by injection pressure of the compressed air which is injected through the first nozzle 102.

The condensed water discharged from the fuel cell may be suctioned by pressure of the bypassed compressed air and simultaneously injected into the inlet of the air compressor 202, and thus the external air passing through the filter/flow rate sensor 204 may pass through the air compressor 202 while being humidified by the injected condensed water to be supplied to the cathode of the fuel cell.

As described above, a cooling effect absorbing heat energy of air increased by an air compression process performed by the air compressor may be obtained and air supplied to the cathode of the fuel cell may be easily humidified by injecting the condensed water discharged from the fuel cell system into the inlet of the air compressor 202 using the pressure of the bypassed compressed air and simultaneously by bypassing some of the compressed air from the outlet of the air compressor for supplying external air to the cathode of the fuel cell 200.

When a separate humidifier is further mounted at the inlet side of the cathode, the relative humidity of air supplied to the cathode of the fuel cell may increase from the inlet of the air compressor in advance and the air may be supplied to the humidifier, and as consequence, a load for a humidification operation of the humidifier may be reduced and the humidification capacity and the size of the humidifier separately mounted at the inlet side of the cathode may decrease.

Meanwhile, when an outlet temperature $T_o$ of the air compressor 202 reaches a targeted temperature $T_t$, the bypass valve 112 mounted in the bypass line 110 may be opened and thus the injected condensed water may be bypassed to the inlet of the air compressor 202 together with the compressed air from the outlet of the air compressor 202. Further, when the outlet temperature $T_o$ of the air compressor 202 is equal to or less than the target temperature $T_t$, an injection amount of the condensed water may be controlled by controlling a bypass valve.

Particularly, the injection amount of the condensed water may control a bypass amount of the compressed air which may be bypassed from the outlet of the air compressor to the inlet to adjust the relative humidity at the outlet of the air compressor to be equal to or less than about 100% and adjust a relative humidity (RH) to be equal to or less than about 100% in a state in which the outlet temperature $T_o$ of the air compressor is equal to or greater than the target temperature $T_t$ and the relative humidity (RH) may be equal to or greater than about 100% or saturated depending on a type of the compressor. For example, in the case of a volumetric compressor such as screw, roots, and the like, compression efficiency may increase by a seal operation of water to perform a control to adjust the RH to be equal to or greater than about 100% such that the condensed water is generated.

As such, by determining whether to inject the condensed water depending on the outlet temperature of the air compressor and simultaneously by reusing the condensed water discharged from the fuel cell system for air humidification, costs may be saved by omitting conventional pump and the like for supplying a pumping water and a freezing phenomenon, a corrosion phenomenon, and the like of a water supply line including the pump, and the like may be prevented.

Figure 4:
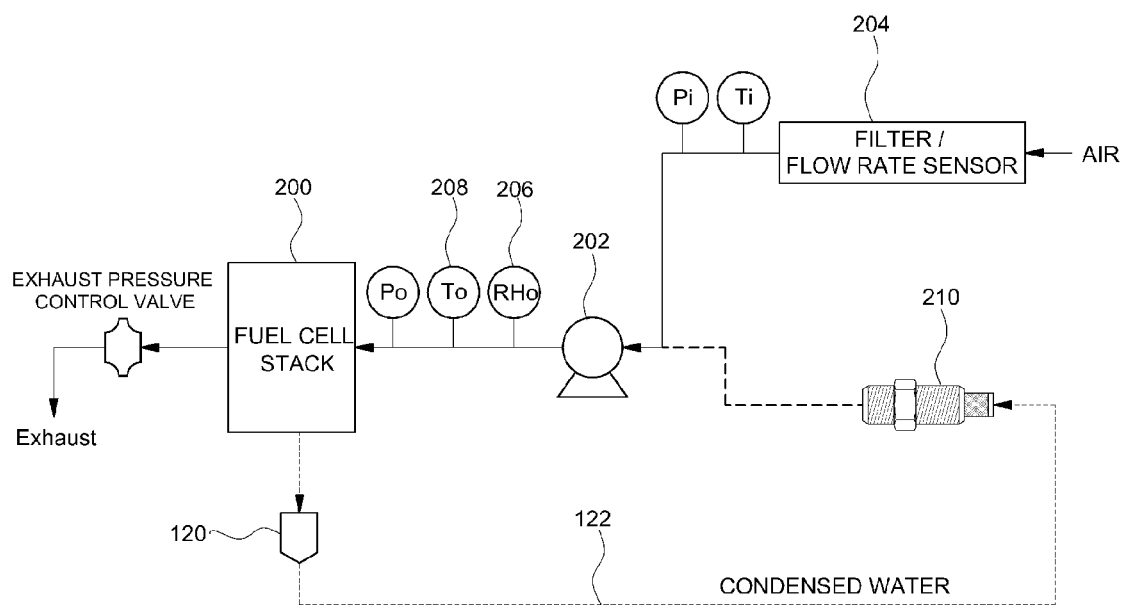
FIG. 4 illustrates an exemplary air humidification device for a fuel cell according to an exemplary embodiment of the present invention.

Alternatively, in an exemplary embodiment of the present invention, the condensed water discharged from the fuel cell may be reused for air humidification by using a water injection nozzle for injecting only water. As illustrated in FIG. 4, a water injection nozzle 210 which may inject only water may be disposed in the air supply line which is connected to the inlet of the air compressor 202 supplying air to the cathode of the fuel cell.

Particularly, a means which supplies water to the water injection nozzle 210 may include the condensed water reservoir 120 which temporarily stores the condensed water discharged from the fuel cell and a condensed water discharge line 122 which is directly connected between the outlet of the condensed water reservoir 120 and the water injection nozzle 210. In this case, compared to a rear end (outlet) position of the air compressor 202, a section between the rear end of the air compressor 202 and the exhaust pressure control valve 212 may have increased pressure. Although the binary spray nozzle for high pressure air and water is replaced with the water injection nozzle 210 injecting only water, the water injection may still be performed.

As such, the condensed water may be supplied from the condensed water reservoir 120 in which the condensed water discharged from the fuel cell is stored to the water injection nozzle 210 through the condensed water discharge line 122 and then may be injected into the inlet of the air compressor 202, such that the external air passing through the filter/flow rate sensor 204 by the injected condensed water may pass through the air compressor 202 while being humidified and then is supplied to the cathode of the fuel cell.

As such, according to various exemplary embodiments of the present invention, the condensed water discharged from the fuel cell system may be directly injected into the inlet of the air compressor 202 by using the water injection nozzle 210, thereby easily humidifying the air supplied to the cathode of the fuel cell.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An air humidification device for a fuel cell, comprising:
an air compressor configured to supply air to a cathode of the fuel cell; and
an injector disposed in an air supply line connected to an inlet of the air compressor to inject condensed water discharged from the fuel cell to the inlet of the air compressor using the bypassed compressed air from an outlet of the air compressor,
wherein a bypass line that connects the outlet of the air compressor to an inlet of an injector includes a bypass valve configured to adjust an opening and closing angle,
wherein the injector is a binary spray nozzle including:
an outer hollow body having a first nozzle disposed at a central portion of one side of the outer hollow body; and
and inner body having a second nozzle which is inserted into the central portion of the first nozzle and is disposed at one end of the inner hollow body, and
wherein a space between the outer hollow body and the inner hollow body of the injector is formed as a compressed air flow space which is communicatedly connected to the outlet of the air compressor by a bypass line, and an inner space of the internal hollow body is formed as a condensed water flow space which is communicatedly connected through a condensed water discharge line connected to a condensed water reservoir of the fuel cell.

2. The air humidification device for a fuel cell of claim 1, wherein the outlet of the air compressor includes a relative humidity measuring humidity sensor and a temperature measuring temperature sensor for air supplied to the cathode in parallel.

3. A fuel cell system having a fuel cell air humidification device of claim 1.

4. A vehicle having a fuel cell system with a fuel cell air humidification device of claim 1.

5. An air humidification device for a fuel cell comprising:
an air compressor configured to supply air to a cathode of the fuel cell; and
an injector disposed in an air supply line connected to an inlet of the compressor to inject condensed water discharged from the fuel cell to the inlet of the air compressor using the bypassed compressed air from an outlet of the air compressor,
wherein a bypass line that connects the outlet of the air compressor inlet of an injector includes a bypass valve configured to adjust an opening and closing angle,
wherein the injector is a binary spray nozzle include:
an outer hollow body having a first nozzle disposed at a central portion of one side the outer hollow body; and
an inner hollow body having a second nozzle which is spacedly inserted into the central portion of the first nozzle and is disposed at one end of the inner hollow body, and
wherein a space between the outer hollow body and the inner hollow body of the injector is formed as a compressed air flow space which is communicatedly connected to the outlet of the air compressor by a bypass line, and an inner space of the internal hollow body is formed as a condensed water flow space which is communicatedly connected through a condensed water discharge line connected to a condensed water reservoir of the fuel cell.

6. The air humidification device for a fuel cell of claim 5, wherein the outlet of the air compressor includes a relative humidity measuring humidity sensor and a temperature measuring temperature sensor for air supplied to the cathode in parallel.

7. A fuel cell system having a fuel cell air humidification device of claim 5.

8. A vehicle having a fuel cell system with a fuel cell air humidification device of claim 5.

9. An air humidification method for a fuel cell, comprising:
suctioning and compressing external air by an air compressor and supplying the compressed external air to the fuel cell;
bypassing, using a bypass line, a portion of the compressed air from an outlet of the air compressor to an inlet side of the air compressor;
injecting, by an injector, condensed water discharged from the fuel cell into the inlet of the air compressor simultaneously with suctioning the condensed water discharged from the fuel cell using the compressed air bypassed to the inlet side of the air compressor; and
passing the external air through the air compressor while the external air being humidified by the injected condensed water,
wherein when an outlet temperature $T_o$ of the air compressor reaches a predetermined temperature $T_t$ or greater, the injected condensed water is bypassed to the inlet of the air compressor along with the compressed air, and when $T_o$ is less than $T_t$, the injection of the condensed water stops.

10. The air humidification method for a fuel cell of claim 9, wherein an injection amount of the condensed water controls a bypass amount of the compressed air bypassed from the outlet of the air compressor to the inlet to adjust a relative humidity at an outlet side of the air compressor to be equal to or less than about 100%.

* * * * *